(12) United States Patent
Palmer et al.

(10) Patent No.: US 10,527,173 B2
(45) Date of Patent: Jan. 7, 2020

(54) RESILIENT SHAFT SEAL

(71) Applicant: AKTIEBOLAGET SKF, Gothenburg (SE)

(72) Inventors: Matthew Palmer, Sycamore, IL (US); John Wilkins, Chicago, IL (US); Alex Paykin, Buffalo Grove, IL (US); Greg Gildea, Lakewood, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 24 days.

(21) Appl. No.: 15/677,230

(22) Filed: Aug. 15, 2017

(65) Prior Publication Data

US 2019/0056029 A1 Feb. 21, 2019

(51) Int. Cl.
| | | |
|---|---|---|
| *F16J 15/3224* | (2016.01) | |
| *F16J 15/3232* | (2016.01) | |
| *F16J 15/3284* | (2016.01) | |
| *F16J 15/322* | (2016.01) | |

(52) U.S. Cl.
CPC ....... *F16J 15/3224* (2013.01); *F16J 15/3232* (2013.01); *F16J 15/3284* (2013.01); *F16J 15/322* (2013.01)

(58) Field of Classification Search
CPC .. F16J 15/3216; F16J 15/3224; F16J 15/3248; F16J 15/3252
USPC .......................................................... 277/561
See application file for complete search history.

(56) References Cited

U.S. PATENT DOCUMENTS

| | | | | |
|---|---|---|---|---|
| 2,743,950 A | | 5/1956 | Helfrecht et al. | |
| 2,743,951 A | * | 5/1956 | Ayres ................... | F16J 15/3232 277/560 |
| 2,797,938 A | * | 7/1957 | Reynolds ............. | F16J 15/3204 277/561 |
| 2,823,051 A | * | 2/1958 | Johnson ................. | B61F 15/22 277/356 |
| 2,823,966 A | * | 2/1958 | Reynolds ................ | F16C 33/78 384/484 |
| 3,455,564 A | | 7/1969 | Dega | |
| 3,554,566 A | * | 1/1971 | Bechtrold ............ | F16J 15/3224 277/561 |
| 3,871,666 A | | 3/1975 | Franz et al. | |
| 3,920,250 A | * | 11/1975 | Eklund ................ | F16J 15/3208 277/555 |
| 4,053,166 A | | 10/1977 | Domkowski | |
| 4,274,641 A | | 6/1981 | Cather | |
| 4,300,778 A | * | 11/1981 | Gagne .................... | F16J 15/166 277/568 |
| 4,360,208 A | * | 11/1982 | Hill ...................... | F16J 15/3284 277/504 |
| 4,426,094 A | | 1/1984 | Antonini | |

(Continued)

*Primary Examiner* — Nicholas L Foster
(74) *Attorney, Agent, or Firm* — J-TEK LAW PLLC; Jeffrey D. Tekanic; Scott T. Wakeman

(57) ABSTRACT

A seal assembly configured to be mounted between a rotatable shaft and a housing has a first side and a second side axially spaced from the first side and includes an annular seal support having a first end at the first side of the seal assembly and a second end spaced axially from the first end, at least one seal body configured to form a seal between the shaft and the seal support, the at least one seal body contacting the seal support at a joint, and a resilient annular body mounted between the seal support and the housing. All portions of the resilient annular body are located radially outward of the joint.

19 Claims, 2 Drawing Sheets

(56) References Cited

U.S. PATENT DOCUMENTS

| | | | |
|---|---|---|---|
| 4,613,143 A | 9/1986 | Butler | |
| 4,699,526 A | 10/1987 | Sato | |
| 4,750,748 A | 6/1988 | Visser | |
| 4,818,620 A | 4/1989 | Pilkington | |
| 4,844,484 A | 7/1989 | Antonini et al. | |
| 4,893,823 A | 1/1990 | Strouse et al. | |
| 4,968,044 A | 11/1990 | Petrak | |
| 5,085,444 A | 2/1992 | Murakami et al. | |
| 5,137,285 A * | 8/1992 | Pick | F16J 15/3216 277/503 |
| 5,326,112 A * | 7/1994 | Paykin | F16J 15/166 277/565 |
| 5,346,230 A | 9/1994 | Schumacher et al. | |
| 5,370,404 A | 12/1994 | Klein et al. | |
| 5,380,016 A * | 1/1995 | Reinsma | F16J 15/3208 277/503 |
| 5,509,667 A * | 4/1996 | Klein | F16C 27/066 277/565 |
| 5,611,548 A | 3/1997 | Dahlhaus | |
| 5,697,710 A | 12/1997 | Iida et al. | |
| 6,298,955 B1 | 10/2001 | Frost | |
| 6,336,638 B1 | 1/2002 | Guth et al. | |
| 6,428,013 B1 | 8/2002 | Johnston et al. | |
| 6,601,855 B1 * | 8/2003 | Clark | F16C 33/7809 277/549 |
| 7,004,471 B2 | 2/2006 | Bryde et al. | |
| 7,648,144 B2 | 1/2010 | Sanada | |
| 7,665,740 B2 | 2/2010 | Munekata et al. | |
| 7,832,735 B2 * | 11/2010 | Paykin | F16J 15/3268 277/550 |
| 7,887,062 B2 | 2/2011 | Dahlheimer | |
| 7,963,526 B2 | 6/2011 | Dahlheimer | |
| 8,459,654 B2 | 6/2013 | Hatch et al. | |
| 8,505,926 B2 | 8/2013 | Toth et al. | |
| 8,646,782 B2 | 2/2014 | Dahlhaus-Preussler | |
| 9,062,773 B2 | 6/2015 | Sedlar et al. | |
| 9,689,496 B2 | 6/2017 | Wilkins et al. | |
| 2005/0134003 A1 | 6/2005 | Bryde et al. | |
| 2007/0158917 A1* | 7/2007 | Paykin | F16J 15/064 277/551 |
| 2007/0194538 A1 | 8/2007 | Munekata et al. | |
| 2008/0258406 A1 | 10/2008 | Dahlheimer | |
| 2008/0272551 A1 | 11/2008 | Sanada | |
| 2008/0284110 A1 | 11/2008 | Dahlheimer | |
| 2010/0133758 A1* | 6/2010 | Kanzaki | B62D 1/16 277/561 |
| 2011/0018209 A1 | 1/2011 | Dahlhaus-Preussler | |
| 2011/0221143 A1 | 9/2011 | Toth et al. | |
| 2012/0228829 A1 | 9/2012 | Sedlar et al. | |
| 2012/0280457 A1 | 11/2012 | Hatch et al. | |
| 2016/0186863 A1* | 6/2016 | Wilkins | F16J 15/3232 384/477 |

\* cited by examiner

RESILIENT SHAFT SEAL

TECHNICAL FIELD

The present invention is directed to a resilient seal assembly for forming a seal between a rotatable shaft and an opening in a housing, which seal assembly prevents lubricant from leaking between the shaft and the housing opening, and, more specifically, to a resilient seal assembly configured to accommodate radial and axial movement between the rotatable shaft and the opening in the housing.

BACKGROUND

It is known to provide seals between a rotatable shaft and an opening through which the shaft passes in order to keep a lubricant such as oil or grease on one side of the seal and to prevent the lubricant from leaking to the other side of the seal.

In many applications, the dimensions and alignment of the shaft and the opening are relatively accurate, and, in such cases, sealing between the shaft and the housing opening can be implemented with a conventional oil seal. There are two common types of conventional oil seals: 1) a radial lip shaft seal, which has a fluorine rubber lip that is held in sealed contact against a shaft using a spring, and 2) a polytetrafluoroethylene (PTFE) seal, which comprises a PTFE lip held against the shaft by a flexible portion of the seal body. However, conventional seals can only tolerate a certain amount of shaft-to-opening misalignment, both when the shaft is stationary and when it is rotating, without allowing lubricant to escape through the seal.

In some applications, the amount of shaft-to-opening misalignment is greater than what can be tolerated by conventional shaft seals. It would therefore be desirable to provide an improved seal assembly that can tolerate relatively large misalignments and/or deviations between a rotatable shaft and an opening in a housing.

SUMMARY

These and other problems are addressed by embodiments of the present disclosure, a first aspect of which comprises a seal assembly configured to be mounted between a rotatable shaft and a housing, which housing has a first side and a second side axially spaced from the first side. The seal assembly comprises an annular seal support having a first end at the first side of the seal assembly and a second end spaced axially from the first end and at least one seal body configured to form a seal between the shaft and the seal support, the at least one seal body contacting the seal support at a joint. The assembly also includes a resilient annular body mounted between the seal support and the housing. All portions of the resilient annular body are located radially outward of the joint.

Another aspect of the disclosure comprises a seal assembly configured to be mounted between a shaft and a housing which seal assembly has a first side and a second side axially spaced from the first side. The seal assembly includes an annular seal support having a first end at the first side of the seal assembly and a second end spaced axially from the first end and at least one seal body configured to form a seal between the shaft and the seal support. The at least one seal body contacts the seal support at a joint. The assembly also includes a resilient annular body mounted between the seal support and the housing. The housing includes a radially inward projecting inner flange located such that the resilient annular body is located between the first side of the seal assembly and the inner flange, and the inner flange includes at least one opening having a circumferential width. Also, the annular seal support includes at least one projection extending into the at least one opening, and the at least one projection has a circumferential width less than the circumferential width of the at least one opening A further aspect of the disclosure comprises a seal assembly configured to be mounted between a shaft and a housing and that has a first side and a second side axially spaced from the first side. The seal assembly includes an annular seal support having a first end at the first side of the seal assembly and a second end spaced axially from the first end and at least one seal body configured to form a seal between the shaft and the seal support. The at least one seal body contacts the seal support at a joint. The assembly also includes shock absorbing means between the annular seal support and the housing for resiliently accommodating radial and axial displacement of the shaft relative to the housing.

BRIEF DESCRIPTION OF THE DRAWINGS

These and other aspects and features of the disclosure will be better understood after a reading of the following detailed description in connection with the attached drawing wherein.

DETAILED DESCRIPTION

Figure 1:
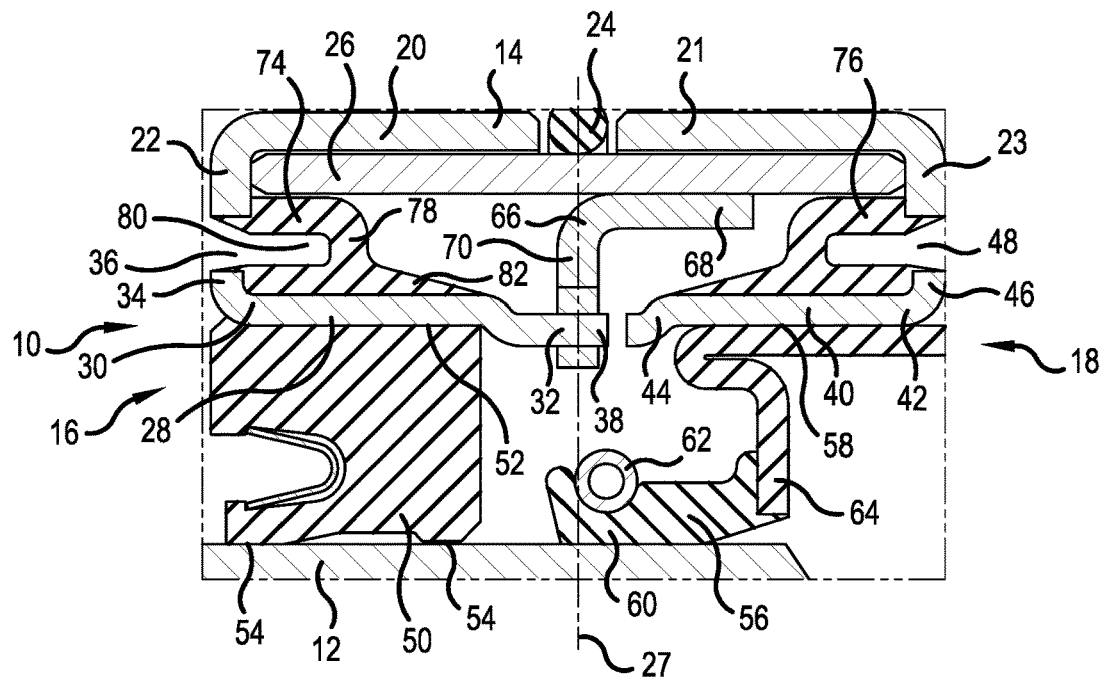
FIG. 1 is a sectional view of a seal assembly according to an embodiment of the present disclosure mounted between a rotatable shaft and a housing.

Referring now to the drawings, wherein the showings are for the purpose of illustrating embodiments of the invention only and not for the purpose of limiting same, FIG. 1 shows a seal assembly 10 mounted between a shaft 12 and a housing 14. The seal assembly has a first side 16 (at the left side of FIG. 1) and a second side 18 (at the right side of FIG. 1).

The housing 14 includes first and second annular outer housing members 20, 21 each having an axially outer, radially inwardly directed flange 22, 23. The outer housing members 20 and 21 are separated by an O-ring 24 and connected to one another by an annular inner housing member 26. A center reference plane 27 passes through the O-ring 24 and divides the housing 14 and seal assembly 10 into two non-identical half portions.

Figure 2:
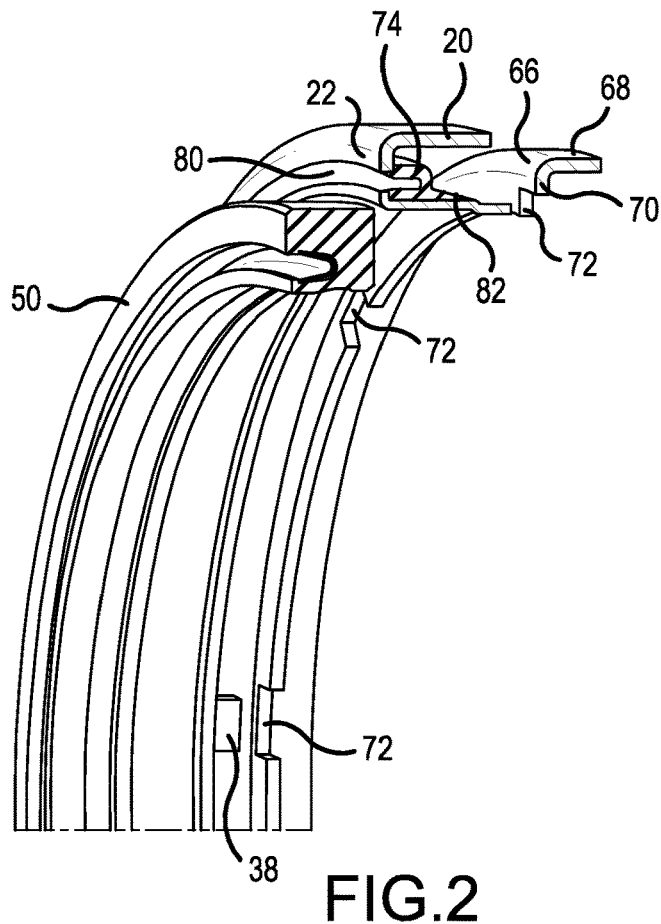
FIG. 2 is an exploded perspective view of a portion of the seal assembly of FIG. 1.

The seal assembly 10 includes a first seal support 28 located radially between the shaft 12 and the housing 14, and the first seal support 28 has a first end 30 (which may be referred to as an axially outer end) at the first side 16 of the seal assembly 10 and a second end 32 (which may referred to as an axially inner end) facing the center reference plane 27 and located between the first side 16 of the seal assembly 10 and the center reference plane 27. The first seal support 28 also includes a radially outwardly extending flange 34 at its first end 30 which is axially aligned with the radially inwardly directed flange 22 of the first outer housing member 20 at the first side 16 of the seal assembly 10. The flange 34 of the first seal support 28 is spaced from the flange 22 of the first housing member 20 by a gap 36. The first seal support 28 also includes a projection 38, best seen in FIG. 2, which projects axially from the first seal support 28 in the direction of the second side 18 of the seal assembly 10 and which passes through the center reference plane 27.

The seal assembly 10 further includes a second seal support 40 which is in general a mirror image of the first seal support 28 but which is installed in the seal assembly 10 such that it is rotated about 45 degrees from the position of the first seal assembly 28. Specifically, the second seal support 40 is located radially between the shaft 12 and the housing 14 and includes a first end 42 (which may be referred to as an axially outer end) at the second side 18 of the seal assembly 10 and a second end 44 (which may be referred to as an axially inner end) facing the center reference plane 27 and located between the second side 18 of the seal assembly 10 and the center reference plane 27. The second seal support 40 includes a radially outwardly extending flange 46 at its first end 42 which is axially aligned with the radially inwardly directed flange 23 of the second outer housing member 21 at the second side 18 of the seal assembly 10, and the flange 46 of the second seal support 40 is spaced from the flange 23 of the second outer housing member 21 by a gap 48. The second seal support 40 also includes a projection (not illustrated), which projects from the second seal support 40 in the direction of the first side 16 of the seal assembly and which passes through the center reference plane 27.

A first seal body 50 is connected to the radially inner side of the first seal support 28 at a joint 52, which seal body 50 in this case is a relatively inflexible member that includes first and second lips 54 that ride on the outer surface of the shaft 12. A second seal body 56 is connected to the radially inner side of the second seal support 40 at a joint 58 and comprises a seal lip 60 biased against the shaft 12 by a garter spring 62, which seal lip 60 is connected to the second seal support 40 by an intermediate connector 64. The specific configurations of the seal bodies, such as the first seal body 50 and the second seal body 56, will be based on the environment in which the seal assembly 10 will be used, and the first and second seal bodies 50, 56 could be identical or could have a form different from what is disclosed in this embodiment without exceeding the scope of the present disclosure.

The seal assembly 10 also includes a bracket 66 that has a first leg 68 connected to the inner side of the inner housing member 26 and a second leg 70 extending from the first leg 68 at a right angle and radially inward toward the shaft 12. The center reference plane 27 is located in and is parallel to the bracket second leg 70. The second leg 70 includes a plurality of circumferentially spaced openings 72 that are open radially in the direction of the shaft 12. The projections 38 of the first seal support 28 extend into every other one of the openings 72, and the projections of the second seal support 40 extend into the remaining, alternate ones of the openings 72. Importantly, the circumferential width of the openings 72 is somewhat greater than the circumferential widths of the projections 38.

A first resilient body 74 is connected between the inner housing member 26 and the radially outer side of the first seal support 28, and a second resilient body 76 is connected between the inner housing member 26 and the radially outer side of the second seal support 40. The first and second resilient bodies 74, 76 are preferably formed from a rubber that is suitable for withstanding the conditions to which the seal assembly 10 will be exposed; however, the invention is not limited to a rubber resilient body, and any material that provides a suitable resiliency can be used. Because these first and second resilient bodies 74, 76 are identical, albeit installed in mirror image orientations, only the first resilient body 74 will be described further herein.

The first resilient body 74 is annular and includes a C-shaped (in cross section) portion 78 that defines an annular, axially outwardly facing channel 80 that is generally aligned with the gap 48 between the flange 34 of the first seal support 28 and the flange 22 of the first outer annular housing member 20. A first portion of the first resilient body 74 abuts against the flange 22 of the first annular outer housing member 20, and a second portion of the first resilient body 74 abuts against the flange 34 of the first seal support 28, and these flanges 22, 34, therefore limit the axial movement of the first resilient body 74 and help prevent the first resilient body 74 from falling out of the seal assembly 10. An extension 82 extends axially inwardly from the C-shaped portion 78, which extension 82 has a radial thickness that is less that the radial thickness of the first resilient body 74 at the C-shaped portion 78, and the radial width of the extension 82 decreases in the direction of the center reference plane 27.

The first resilient body 74 and the second resilient body 76 function as shock absorbers to accommodate movements or misalignments between the shaft 12 and the housing 14. This is true when a relatively rigid, non-compressible seal body, such as the first seal body 50, is located between the first seal support 28 and the shaft 12 and when a relatively flexible seal body, such as the second seal body 56, is located between the second seal support 40 and the shaft 12, and the shock-absorbing function of the first and second resilient bodies 74, 76, allows the first and second seal bodies 50, 56 to perform their respective sealing functions even when the shaft 12 is not precisely axially aligned with the housing 14 and/or when the shaft 12 shifts radially during operation. In other words, the first and second resilient bodies 74, 76 allow for greater deviations between the shaft 12 and the housing 14 than would otherwise be possible when using the first and second seal bodies 50, 56 without requiring modification to the first and second seal bodies 50, 56, themselves, which seal bodies are optimized for use as shaft seals between shafts and housings that are precisely aligned.

Furthermore, the projections 38 of the first seal support 28 and the projections of the second support 40 interact with the openings 72 in the second leg 70 of the bracket 66 to limit relative rotation between the first seal support 28 and the housing 14 and between the second seal support 40 and the housing 14. That is, while the circumferential width of the openings 72 is greater than the circumferential width of the projections 38, 49, if the first seal support 28 rotates too far relative to the housing 14, the projections 38 will contact the ends of the openings 72 and prevent further relative rotation of the first seal support 28 and the housing 14. The use of the bracket 66 and the projections 38 is not required in installations in which relative rotation between the seal supports 28, 40 and the housing 14 is unlikely to occur. However, the projections 38 interacting with the openings 72 limits relative rotation between the first and second seal supports 28, 40 and the housing 14 which could damage the first and second resilient bodies 74, 76.

Figure 3:
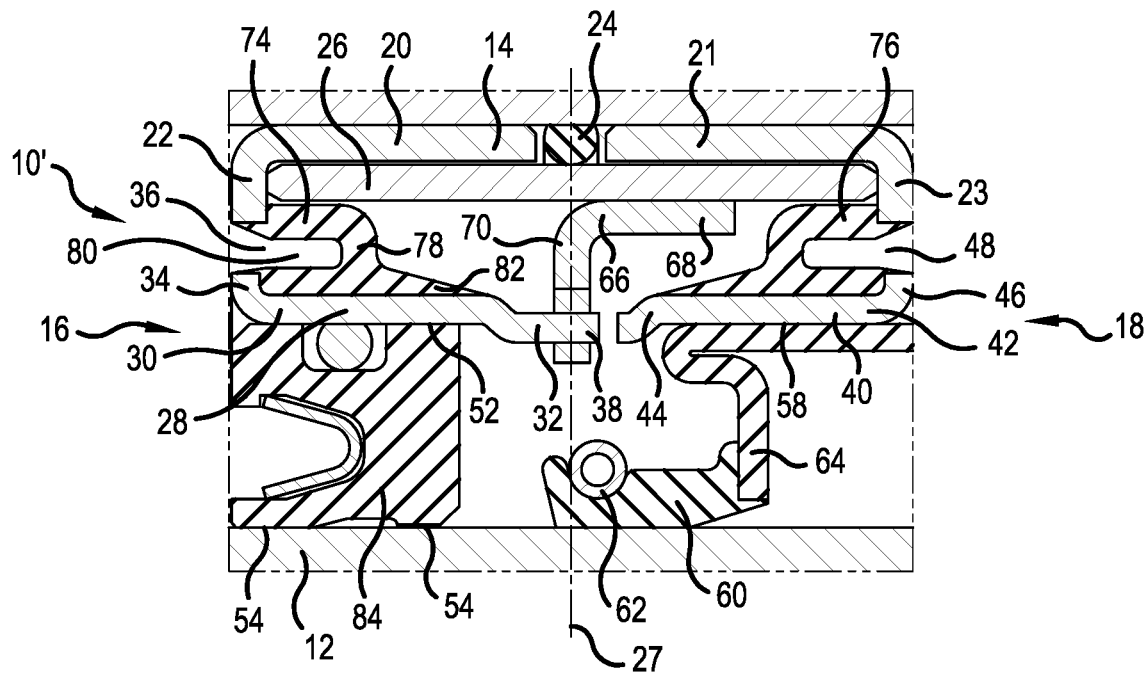
FIG. 3 is a sectional view of a seal assembly according to a second embodiment of the present disclosure mounted between a rotatable shaft and a housing.

Because the first and second resilient bodies 74, 76 are modular, they can be used to perform a shock absorbing function regardless of the type of seal body actually forming a seal with the shaft 12. For example, FIG. 3 shows an example of a seal assembly 10' that includes a third seal body 84 between the first seal support 28 and the shaft 12.

While structurally different than the first seal body 50 of FIG. 1, the same first resilient body 74 is used to provide a shock-absorbing function for this third seal body 84.

Figure 4:
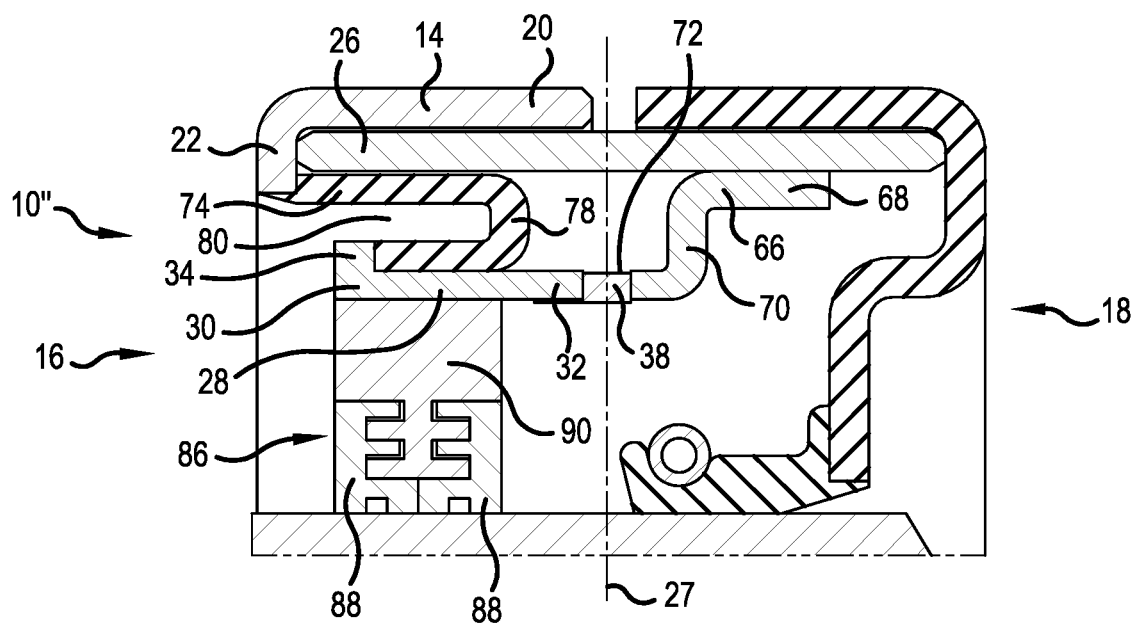
FIG. 4 is a sectional view of a seal assembly according to a third embodiment of the present disclosure mounted between a rotatable shaft and a housing.

Similarly, FIG. 4 illustrates a fourth seal assembly 10'" that includes a fourth seal body 86, in this case formed of two radially inner bodies 88 press-fit on the shaft 12 and an outer body 90 forming a labyrinth seal with the radially inner bodies 88. This seal body 86 is also helped to function properly despite potential misalignments between the shaft 12 and the housing 14 by the presence of the first resilient body 74. In the case of this fourth seal assembly 10'", only the first resilient member is 74 is present. Also, the flange 34 of the first seal support 28 in this embodiment is located axially inward of the flange 22 of the first annular outer housing member 20.

The present invention has been described above in terms of several preferred embodiments; however, modifications and additions to these embodiments will become apparent to persons of skill in the relevant arts upon a reading of the foregoing description. It is intended that all such modifications and additions for a part of the present invention to the extent they fall within the scope of the several claims appended hereto.

We claim:

1. A seal assembly configured to be mounted between a rotatable shaft and a housing, the seal assembly comprising:
    a first side and a second side axially spaced from the first side,
    a first annular seal support having a first end at the first side of the seal assembly and a second end spaced axially inward from the first end and a second annular seal support having a first end at the second side of the seal assembly and a second end spaced axially inward from the first end of the second annular seal support, the second end of the first seal support being axially spaced from the second end of the second seal support by a first axial gap;
    a first seal body configured to form a first seal between the shaft and the first annular seal support, the first seal body being located radially inward of the first annular seal support and contacting the first annular seal support at a first joint;
    a second seal body configured to form a second seal between the shaft and the second annular seal support, the second seal body contacting the second annular seal support at a second joint, and
    a first resilient annular body on the first annular seal support and configured to be mounted between the first annular seal support and the housing and a second resilient annular body on the second annular seal support and configured to be mounted between the second annular seal support and the housing, the first resilient annular body being axially spaced from the second resilient annular body by a second axial gap,
    wherein all portions of the first resilient annular body are located radially outward of the first joint and all portions of the second resilient annular body are located radially outward of the second joint.

2. The seal assembly according to claim 1, wherein the first resilient annular body has an axially facing channel open toward the first side of the seal assembly and the second resilient annular seal body has an axially facing channel open toward the second side of the seal assembly.

3. A seal assembly configured to be mounted between a rotatable shaft and a housing, the seal assembly having a first side and a second side axially spaced from the first side, the seal assembly comprising:
    an annular seal support having a first end at the first side of the seal assembly and a second end spaced axially from the first end;
    at least one seal body configured to form a seal between the shaft and the seal support, the at least one seal body contacting the seal support at a joint; and
    a resilient annular body for mounting between the seal support and the housing,
    wherein all portions of the resilient annular body are located radially outward of the joint,
    wherein the resilient annular body has an axially facing channel open toward the first side of the seal assembly,
    wherein the first end of the seal support includes a radial flange projecting away from the shaft, and
    wherein a first portion of the resilient annular body abuts against the flange of the seal support.

4. The seal assembly according to claim 3, wherein the housing includes a radial side flange at the first side of the seal assembly projecting toward the shaft and wherein a second portion of the resilient annular body includes an annular rabbet configured to abut against the side flange of the housing.

5. The seal assembly according to claim 1, wherein an axial width of a radially innermost portion of the resilient body is greater than an axial width of a radially outermost portion of the resilient body.

6. The seal assembly according to claim 1, including the housing.

7. The seal assembly according to claim 1, including a bracket configured to be connected to the housing, the bracket having a radially extending flange projecting between the second end of the first annular seal support and the second end of the second annular seal support.

8. The seal assembly according to claim 7, wherein the flange includes a plurality of notches each having a circumferential width.

9. The seal assembly according to claim 8, wherein the second end of the first annular seal support includes a plurality of circumferentially spaced, axially extending tabs, each of the tabs extending into one of the plurality of notches in the flange and each of the tabs having a circumferential width.

10. The seal assembly according to claim 9, wherein the circumferential width of each tab of the plurality of tabs is less than the circumferential width of the respective each notch of the plurality of notches in which each tab is received.

11. The seal assembly according to claim 1, wherein the first resilient annular body comprises a first C-shaped channel open toward the first side and wherein the second resilient annular body comprises a second C-shaped channel open toward the second side.

12. The seal assembly according to claim 11, wherein the first resilient annular body includes a first projection extending away from the first C-shaped channel toward the second side and wherein the second resilient annular body includes a second projection extending away from the second channel toward the first side.

13. The seal assembly according to claim 12, wherein the first projection tapers radially in a direction from the first side toward the second side.

14. The seal assembly according to claim 13, wherein the first projection includes a side edge extending along the first annular seal support.

15. The seal assembly according to claim 14, wherein the first C-shaped channel is defined by a radially inner arm and a radially outer arm and a bight connecting the radially inner arm to the radially outer arm and wherein the radially outer arm includes an annular rabbet configured to engage a portion of the housing.

16. The seal assembly according to claim 3, including the housing.

17. The seal assembly according to claim 3, including:
an additional annular seal support having a first end at the second side of the seal assembly and a second end axially spaced from the first end of the additional annular seal support, the additional annular seal support being axially spaced from the annular seal support by a gap,
an additional seal body configured to form a seal between the shaft and the additional annular seal support, and
an additional resilient annular body having an axially facing channel open toward the second side of the seal assembly.

18. The seal assembly according to claim 17, including:
a bracket configured to be connected to the housing, the bracket having a radially extending flange projecting between the second end of the annular seal support and the second end of the additional annular seal support, the flange including a plurality of notches each having a circumferential width,
wherein the second end of the annular seal support includes a plurality of circumferentially spaced, axially extending tabs, each of the tabs extending into one of the plurality of notches in the flange and each of the tabs having a circumferential width less than a circumferential width of the notches.

19. The seal assembly according to claim 18, wherein the resilient annular body includes a first projection extending away from the channel toward the second side, the first projection tapering radially in a direction from the first side toward the second side.

\* \* \* \* \*